(12) United States Patent
Ben Dor et al.

(10) Patent No.: US 8,244,616 B1
(45) Date of Patent: Aug. 14, 2012

(54) METHODS, COMPUTER SYSTEMS, SOFTWARE, AND PORTFOLIO FOR OUTPERFORMING ALTERNATIVE INDICES

(75) Inventors: Arik Ben Dor, Cresskill, NJ (US); Madhur Ambastha, Jersey City, NJ (US)

(73) Assignee: Barclays Capital Inc., New York, NY (US)

( * ) Notice: Subject to any disclaimer, the term of this patent is extended or adjusted under 35 U.S.C. 154(b) by 369 days.

(21) Appl. No.: 12/239,584

(22) Filed: Sep. 26, 2008

(51) Int. Cl.
*G06Q 40/00* (2012.01)

(52) U.S. Cl. .......................... 705/36 R; 705/35; 705/37

(58) Field of Classification Search .................. 705/35, 705/36 R, 37
See application file for complete search history.

(56) References Cited

U.S. PATENT DOCUMENTS

| | | | |
|---|---|---|---|
| 7,263,502 B1 | 8/2007 | Ramaswami | |
| 2004/0024671 A1* | 2/2004 | Freund | 705/35 |
| 2004/0133500 A1 | 7/2004 | Thompson et al. | |
| 2005/0108134 A1 | 5/2005 | Harlow et al. | |
| 2006/0059074 A1* | 3/2006 | Freund | 705/35 |
| 2006/0100946 A1* | 5/2006 | Kazarian | 705/35 |
| 2006/0100949 A1* | 5/2006 | Whaley et al. | 705/36 R |
| 2008/0195553 A1 | 8/2008 | Umlauf | |
| 2008/0208769 A1* | 8/2008 | Beer et al. | 705/36 R |
| 2009/0265279 A1* | 10/2009 | Mintz et al. | 705/71 |
| 2011/0213732 A1* | 9/2011 | Maounis | 705/36 R |

OTHER PUBLICATIONS

James Pethokoukis. "Now You, Too, Can Enter the World of 007 Finance." New York Times Jan. 28, 2007 (4 pages).

* cited by examiner

*Primary Examiner* — Lalita M Hamilton
(74) *Attorney, Agent, or Firm* — Morgan Lewis & Bockius LLP

(57) ABSTRACT

In one aspect, the invention comprises a computer-implemented method comprising: (1) electronically receiving data describing a fund index and funds on which the index is based; (2) electronically receiving data describing one or more securities; (3) electronically receiving data describing returns of: (a) the fund index, (b) funds on which the index is based, and (c) the one or more securities; (4) electronically identifying a subset of funds on which the fund index is based as superior-performing funds over a period of time preceding a first time; and (5) constructing, at the first time, and based on the identified subset of funds, a first portfolio of securities whose return exceeds a return of the fund index over a first period of time. Other aspects of the invention comprise software for implementing the above aspect and embodiments thereof, as well as portfolios constructed according to the above aspect and embodiments thereof.

30 Claims, 4 Drawing Sheets

| Factor | Acronym | Details | Trading Exchange | Primary Data source | Alternative Data source2 | Factor month-to-date return (USD denominated) |
|---|---|---|---|---|---|---|
| Call/Put on S&P 500 Index | "SPCa"/ "SPPa" | 2nd month contract closest to the money as of close on monthly rebalancing date. For example, June portfolio will use SPX July option contract and July portfolio will use the SPX August option contract. LBAR assumes that SPX options are listed with exercise price at every 5 points (1395, 1400, 1405, and so on). Call/put contracts with exercise price closest to SPX close on monthly rebalancing date are selected. For example, if SPX close on monthly rebalancing date is 1402.4, LBAR selects call and put contract with exercise price at 1400. | CBOE | Reuters | Bloomberg e.g., SPX 7 C1400 <Index> for June | (Contract close on calculation date/Contract close on last monthly rebalancing date) -1. Closing price is taken as the mid of the last bid and ask. |
| Call/Put on DAX Index | "DXCa"/ "DXPa" | 2nd month contract closest to the money as of close on monthly rebalancing date. For example, June portfolio will use DAX July option contract. July portfolio will use the DAX August option contract, and so on. LBAR assumes that DAX options are listed with exercise price at every 50 points (6995, 7000, 7050, and so on). Call/put contracts with exercise price closest to DAX close on monthly rebalancing date are selected. For example, if DAX close on monthly rebalancing date is 7024.9, LBAR selects call and put contract with exercise price at 7000. | Deutsche Borse | Reuters | Bloomberg e.g., DAX 7 C7100 <Index> for June | (Contract close on calculation date * EURUSD spot rate on calculation date)/(Contract close on last monthly rebalancing date * EURUSD spot rate on last monthly rebalancing date) -1.¹ Closing price is taken as the average of last bid and last ask. ¹DAX option closing price on a given day is converted from EUR to USD at the spot EURUSD rate on that date. Spot rates are sourced from Lehman Brothers Fixed Income Indices. |

| Factor | Acronym | Details | Trading Exchange | Primary Data source | Alternative Data source2 | Factor month-to-date return (USD denominated) |
|---|---|---|---|---|---|---|
| Call/Put on S&P 500 Index | "SPCa"/ "SPPa" | 2$^{nd}$ month contract closest to the money as of close on monthly rebalancing date. For example, June portfolio will use SPX July option contract and July portfolio will use the SPX August option contract. LBAR assumes that SPX options are listed with exercise price at every 5 points (1395, 1400, 1405, and so on). Call/put contracts with exercise price closest to SPX close on monthly rebalancing date are selected. For example, if SPX close on monthly rebalancing date is 1402.4, LBAR selects call and put contract with exercise price at 1400. | CBOE | Reuters | Bloomberg e.g., SPX 7 C1400 <Index> for June | (Contract close on calculation date/Contract close on last monthly rebalancing date) -1. Closing price is taken as the mid of the last bid and ask. |
| Call/Put on DAX Index | "DXCa"/ "DXPa" | 2$^{nd}$ month contract closest to the money as of close on monthly rebalancing date. For example, June portfolio will use DAX July option contract. July portfolio will use the DAX August option contract, and so on. LBAR assumes that DAX options are listed with exercise price at every 50 points (6995, 7000, 7050, and so on). Call/put contracts with exercise price closest to DAX close on monthly rebalancing date are selected. For example, if DAX close on monthly rebalancing date is 7024.9, LBAR selects call and put contract with exercise price at 7000. | Deutsche Borse | Reuters | Bloomberg e.g., DAX 7 C7100 <Index> for June | (Contract close on calculation date * EURUSD spot rate on calculation date)/(Contract close on last monthly rebalancing date * EURUSD spot rate on last monthly rebalancing date) -1.⁺ Closing price is taken as the average of last bid and last ask. ⁺DAX option closing price on a given day is converted from EUR to USD at the spot EURUSD rate on that date. Spot rates are sourced from Lehman Brothers Fixed Income Indices. |

FIG. 1

| Factor | Acronym | Details | Trading Exchange | Primary Data source | Alternative Data source2 | Factor month-to-date return (USD denominated) |
|---|---|---|---|---|---|---|
| Russell 2000 e-mini futures | "RUT" | Quarterly month contracts on e-mini futures. To avoid rebalancing in the middle of the month (when future contracts expire), Russell 2000 e-mini futures contracts are rolled at end of month. So for example, June portfolio (as well as July and Aug) will use Sep contract. September portfolio will use the December futures contract, and so on. | CME | Reuters (e.g., TFSU8 for June) | Bloomberg: e.g., RRU8 for June | (Futures close on calculation date/Futures close on last monthly rebalancing date) -1 |
| iShares MSCI EM Index ETF | "EEM" | EM ETF total return | U.S. AMEX | Reuters (RIC: EEM) | Bloomberg: EEM US <Equity> | (Adjusted EEM close on calculation date/EEM close on last monthly rebalancing date) -1 EEM closing levels on calculation date are adjusted for dividends. |
| LB U.S. Agg. Index | "AGG" | Total return on Lehman Brothers U.S. Aggregate Index (IndexID: 1) | LB Fixed Income Indices | Bloomberg: LBUSTRUU <Index> | MTD returns directly sourced from Lehman Brothers Fixed Income Indices | LB U.S. Agg. Index |
| High Yield CDX | "HY" | Funded return on Lehman Brothers HY CDX Index (RBI Convention, IndexID: 20006) | LB Fixed Income Indices | Bloomberg: LX13MRUU <Index> | MTD returns directly sourced from Lehman Brothers Fixed Income Indices | High Yield CDX |
| Call / Put on custom FX basket | "FXCa" / "FXPa" | FX basket composed of 70% EUR/USD, 20% JPY/USD, 10% GBP/USD. Options are struck 1 month to expiry. Options are priced using Black model. | OTC | LB Fixed Income Indices | (Option close on calculation date/Option close on last monthly rebalancing date) -1 | Call / Put on custom FX basket |

FIG. 2

| Factor | Acronym | Details | Trading Exchange | Primary Data source | Alternative Data source2 | Factor month-to-date return (USD denominated) |
|---|---|---|---|---|---|---|
| LBCI Total Return | "LBCI" | Total return on Lehman Brothers Commodity Index | LB Fixed Income Indices | Bloomberg: LBCITR <Index> | MTD returns directly sourced from Lehman Brothers Fixed Income Indices | LBCI Total Return |
| VIX Futures | "VIX" | 2$^{nd}$ month contracts. For example, June portfolio will use VIX July contract. July portfolio will use the VIX August futures contract, and so on. | CFE (CBOE Futures Exchange) | Reuters (e.g., VXN8:VE for June) | Bloomberg: e.g., UXN8 for June | VIX Futures |
| LIBOR | "LIBOR" | 1-month USD LIBOR | LB Fixed Income Indices | Bloomberg: US0001M <Index> | 1 month USD LIBOR as of close on last monthly rebalancing date * (number of days elapsed since last monthly rebalancing date/360) LIBOR return for LBAR return calculation is calculated based on the LIBOR rate fixed as of last monthly rebalancing date, using an Act/360 convention. The LBAR optimization though uses LIBOR monthly return as LIBOR rate fixed as of last monthly rebalancing date * (1/12). | LIBOR |

FIG. 3

METHODS, COMPUTER SYSTEMS, SOFTWARE, AND PORTFOLIO FOR OUTPERFORMING ALTERNATIVE INDICES

CROSS-REFERENCE TO RELATED APPLICATIONS

This application is related to U.S. patent application Ser. No. 12/184,122, filed Jul. 31, 2008. The entire contents of that application are incorporated herein by reference.

INTRODUCTION

Hedge fund Outperformance STrategy (HOST) baskets, which are comprised in an aspect of the present invention, are portfolios of liquid instruments geared towards providing a higher return than that of an overall universe of hedge funds. One example of an overall universe of hedge funds is the HFRI Composite Index, maintained by Hedge Fund Research, Inc., and which is currently the most widely used Index for measuring performance of the Hedge Fund market. The goal of HOST is to exploit performance persistence of the best hedge fund managers ("star" funds) to outperform the average fund in the hedge fund universe. Although the description herein focuses on hedge funds, those skilled in the art will recognize that the invention may be used in conjunction with any indexed group of funds or securities.

HOST baskets, in an embodiment, are based on a predetermined set/portfolio of liquid instruments that span the financial markets and are rebalanced monthly. In one aspect of the invention, instruments used in embodiments of the present invention were judiciously selected following a battery of tests so that they span the investment universe of the funds: stocks, bonds, commodities, credit, currency and volatility. In one embodiment, all securities are derivatives and, thus, there is no restriction on using leverage.

In one aspect of the invention, the composition of the portfolio (i.e., the amount to invest in each instrument in the portfolio) is determined based on analyzing the historical return time-series of the hedge funds returns to be replicated. Each month, the portfolio is constructed by finding the set of "weights" (for each instrument) that would have minimized the return tracking error between the portfolio (based on the weights examined) and the hedge funds to be replicated over the analysis period.

Embodiments of the present invention are different from other products in this field in at least the respects described below. None of the products mentioned herein is conceded to be prior art to the present invention.

Other hedge fund replication related products are known: Goldman Sachs (ART—Absolute Return Tracker), Merrill Lynch Factor Index, J.P. Morgan (ABI—Alternative Beta Index), and Bear Stearns (MAST). All of these products aim to replicate the overall universe of hedge funds—i.e., to deliver returns that are similar to broad hedge fund indices. The goal of HOST is to outperform the broad hedge fund indices, not replicate them. The application utilizes performance persistence among the best fund managers. By mimicking the investment style of the best managers, HOST seeks to outperform the broad hedge fund indices which reflect the average return earned by the overall universe of hedge funds. Of course, those skilled in the art will recognize that HOST will not always outperform broad hedge fund indices. The goal of HOST is to outperform the broad hedge fund indices, but it may under-perform in a certain month, or over a certain period of time, depending on the performance of the star funds that it tracks.

In an embodiment, HOST ranks each hedge fund relative to its peers, using a "relative risk-reward ratio," described below. The relative risk-reward ratio metric of ranking funds addresses differences in leverage across funds, as well as "return smoothing" and style misclassification.

In addition, in one embodiment, all securities are derivatives and there is thus no restriction on using leverage. Furthermore, an embodiment of the present invention uses at-the money put and call options on S&P500 Index, DAX Index, and FX basket. This enables generation of various return profiles (e.g., straddles) which hedge funds are known to employ, while controlling the level of risk.

In one aspect, the invention comprises a computer-implemented method comprising: (1) electronically receiving data describing a fund index and funds on which the index is based; (2) electronically receiving data describing one or more securities; (3) electronically receiving data describing returns of: (a) the fund index, (b) funds on which the index is based, and (c) the one or more securities; (4) electronically identifying a subset of funds on which the fund index is based as superior-performing funds over a period of time preceding a first time and (5) constructing, at the first time, and based on the identified subset of funds, a first portfolio of securities whose return exceeds a return of the fund index over a first period of time.

In various embodiments: (1) the identifying comprises, for each fund, calculating a relative risk-reward ratio; (2) the identifying comprises, for each fund, calculating an excess return over peer funds; (3) the excess return is averaged over the second period of time; (4) the identifying further comprises dividing the averaged excess return by a standard deviation of the excess return; (5) one or more of the securities are derivative securities; (6) at least one of the one or more derivative securities is a put option; (7) at least one of the one or more derivative securities is a call option; (8) the put option is an at-the-money put option; (9) the call option is an at-the-money call option; (10) at least one of the one or more derivative securities is an index swap; (11) the method further comprises, at a second time that is subsequent to the first time, constructing a second portfolio of securities whose return exceeds a return of the fund index over a second period of time; (12) the second time is approximately one month after the first time; (13) constructing the first portfolio comprises identifying a set of one or more weights, one weight for each security in the first portfolio, such that the set of weights minimizes return tracking error between the superior-performing funds and the first portfolio of securities over the first period of time; (14) the tracking error is calculated based on a sum of squared return residuals between the first portfolio and the fund index; (15) the securities in the first portfolio comprise one or more call options and one or more put options; and (16) the call options comprise one or more at-the-money call options and one or more at-the-money put options.

Other aspects of the invention comprise software for implementing the above aspects and embodiments, as well as portfolios constructed according to the above aspects and embodiments.

BRIEF DESCRIPTION OF THE DRAWING

FIG. 1 shows information regarding instruments in an exemplary portfolio;

FIG. 2 shows information regarding more instruments in the exemplary portfolio;

FIG. 3 shows information regarding more instruments in the exemplary portfolio.

DETAILED DESCRIPTION

Figure 4:
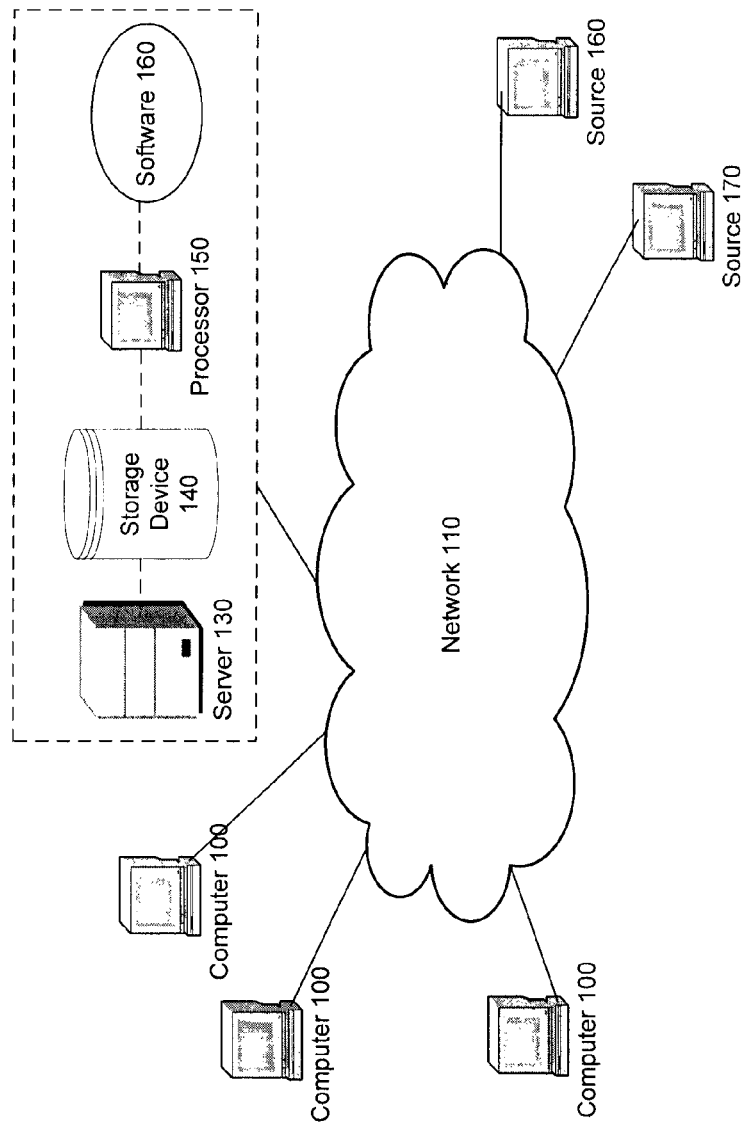
FIG. 4 depicts a computer based system for processing data according to an embodiment of the invention.

In one aspect of the invention, instruments used in embodiments of the present invention were judiciously selected following a battery of tests so that they span the investment universe of the funds: stocks, bonds, commodities, credit, currency and volatility. In an embodiment, the HOST basket comprises 13 instruments that span the breadth of the investment universe, as shown in FIGS. 1-3 and listed below. As used herein, the term "factor" is interchangeable with "instrument."

At-the-money ("ATM") Options:
1. Call on S&P 500 Index ("SPCa")
2. Put on S&P 500 Index ("SPPa")
3. Call on DAX Index ("DXCa")
4. Put on DAX Index (DXPa")
5. Call on custom FX basket ("FXCa")
6. Put on custom FX basket ("FXPa")

Futures:
7. Russell 2000 e-mini futures ("RUT")
8. VIX Futures ("VIX")

Exchange Traded Fund:
9. iShares MSCI Emerging Markets Index Exchange Traded Fund ("EEM")

Total Return Swap:
10. Lehman Brothers U.S. Aggregate Index ("AGG")
11. Lehman Brothers High Yield CDX Index ("HY")
12. Lehman Brothers Commodity Index Total Return ("LBCI")

LIBOR:
13. LIBOR

This portfolio is exemplary, and the present invention is not limited to this illustrative combination of instruments. Other instruments and combinations are contemplated to be within the scope of the present invention.

Selecting Star Hedge Funds and Return

Hedge fund data used for the construction of a HOST embodiment is based on different hedge fund return databases. In one embodiment, all the hedge funds in the HFN (Hedgefund.net) database are used, and then "star" hedge funds are selected using an objective algorithm. An exemplary algorithm is described below.

The identification of "star" funds is done once a year using the previous 12 months of data for each fund as follows: every December, hedge funds are ranked relative to the other funds in their style category. Each fund receives a score based on its relative risk-reward ratio" The relative risk-reward ratio of a fund is the excess return of the fund over that of the peer funds in its style category, averaged over the previous 12 months, divided by the standard deviation of the excess performance. Funds are then assigned into quartiles based on their relative risk-reward ratio, and the top quartile of funds is identified as the "star" funds. For convenience, the return of the star hedge funds will be denoted herein as $R^{HF}$.

HOST Portfolio Weights Calculation

In one aspect of the invention, the "weight" of each instrument (i.e., the amount to invest in each instrument) in the portfolio is determined. The factor weights for all the factors (except for USD LIBOR) are calculated using a rules-based, discretion-free optimization algorithm. In one embodiment, the algorithm seeks to explain excess returns over USD LIBOR for the time-series of hedge funds returns as the weighted sum of excess returns for each of the factors. Specifically, for the exemplary portfolio of FIGS. 1-3, the algorithm ideally wants to satisfy the equality below for each time t:

$$R_t^{HF} - R_t^{Libor} = \omega_1(R_t^{EM} - R_t^{Libor}) + \omega_2(R_t^{AGG} - R_t^{Libor}) + \omega_3(R_t^{HY} - R_t^{Libor})$$

$$+ \omega_4(R_t^{SPCa} - R_t^{Libor}) + \omega_5(R_t^{SPPa} - R_t^{Libor}) + \omega_6(R_t^{DXCa} - R_t^{Libor}) + \omega_7(R_t^{DXPa} - R_t^{Libor})$$

$$+ \omega_8(R_t^{LBCI} - R_t^{Libor}) + \omega_9(R_t^{FXCa} - R_t^{Libor}) + \omega_{10}(R_t^{FXPa} - R_t^{Libor}) + \omega_{11}R_t^{RUT} + \omega_{12}R_t^{VIX} \quad (1)$$

where $R_t^{HF}$ is the star hedge funds' return at a time t, $R_t^{Libor}$ is LIBOR's return at a time t, $R_t^{EM}$ is EEM's return at time t, $\omega_1$ is EEM's weight in the portfolio, $R_t^{AGG}$ is AGG's return at time t, $\omega_2$ is AGG's weight in the portfolio, and so on for each of the instruments in the portfolio (except LIBOR). The abbreviations for the instruments are shown in the list of instruments above and also in FIGS. 1-3.

However, satisfying this equality in equation (1) is the ideal, and in actuality, there will most likely be some difference between the left and right sides of equation (1) at some times t. That is, the portfolio will most likely not be able to perfectly replicate the star funds' performance at all times. The difference between the left and right sides of equation (1) will be referred to herein as "residual tracking error" and will be denoted as $e_t$ for a time t. Specifically, at each time t:

$$e_t = R_t^{HF} - R_t^{Libor} - [\omega_1(R_t^{EM} - R_t^{Libor}) + \omega_2(R_t^{AGG} - R_t^{Libor}) + \omega_3(R_t^{HY} - R_t^{Libor})$$

$$+ \omega_4(R_t^{SPCa} - R_t^{Libor}) + \omega_5(R_t^{SPPa} - R_t^{Libor}) + \omega_6(R_t^{DXCa} - R_t^{Libor}) + \omega_7(R_t^{DXPa} - R_t^{Libor})$$

$$+ \omega_8(R_t^{LBCI} - R_t^{Libor}) + \omega_9(R_t^{FXCa} - R_t^{Libor}) + \omega_{10}(R_t^{FXPa} - R_t^{Libor}) + \omega_{11}R_t^{RUT} + \omega_{12}R_t^{VIX}] \quad (2)$$

The value of $R_t^{HF}$ is computed as described above, and the other returns in equation (2) are publicly available as of the monthly rebalancing date. In one embodiment, each factor return is rounded to 1/100th of a basis point.

In one embodiment, the objective of the optimization algorithm is to minimize a weighted sum of squared residual tracking errors in a particular span of time by adjusting the weights $\omega$. Specifically, the optimization algorithm adjusts the weights $\omega$ to perform:

$$\text{Min} \sum_{t=1}^{T} \Psi(t) \times e_t^2 \quad (3)$$

where $e_t$ is provided in equation (2), and $\Psi(t)$ is a time-based function that allocates different importance to different times t. For example, in one embodiment, the optimization algorithm allocates more importance to more recent times, and less important to earlier times. In this case, $\Psi(t)$ can be an exponential decay function that decays as time gets earlier and earlier.

This allows HOST to quickly respond to more recent market conditions and hedge funds return realizations. The time-based function $\Psi(t)$ will also be referred to herein as a "rebalancing weighting factor." One skilled in the art will understand the ways to actually implement/perform the minimization operation in equation (3). In various embodiments, the algorithm includes additional constraints.

For example, in one embodiment, the optimization algorithm performs equation (3) while keeping the weight of EEM non-negative. In one embodiment, the optimization algorithm considers a span of time that runs up to one month before the rebalancing date, to reflect realistically the timing of reported returns by hedge funds. For example, factor weights for February 2008 are determined using the optimization over January 2005-December 2007 time period.

After the weight of each instrument in the portfolio (except LIBOR) is rebalanced, the weight for LIBOR ($\omega_{13}$) is computed as:

$$e_{13} = 1 - \sum_{i=1}^{10} \omega_i \quad (4)$$

The model uses USD LIBOR as the funding rate, with cash being invested or borrowed at that rate. In equation (4), the weights of "RUT" and "VIX" are not included because they are already unfunded (i.e., price) returns. In one embodiment, all weights are rounded to 1/100th of a percentage point.

In an exemplary embodiment, the HOST basket is rebalanced monthly on the last Index Business Day of each month (the "monthly rebalancing date"). As used herein, "Index Business Day" means a day on which commercial banks and foreign exchange markets settle payments and are open for general business. The factor weights ($\omega$) are computed at the beginning of each month and are held constant over the duration of that month.

The factor weights represent the composition of the HOST portfolio. A positive weight indicates an investment and a negative weight indicates, for example, a short for a future or a payout of the return in a swap contract. Since EEM is an exchange traded fund, it does not allow for any negative weights. The magnitude of the weight corresponds to the magnitude of the amount associated with the instrument. The composition of the HOST as per September 2008 was:

| Month | September 2008 |
|---|---|
| EEM | 18.96% |
| RUT | −8.04% |
| VIX | −4.29% |
| AGG | −31.44% |
| HY | −25.42% |
| LBCI | 13.09% |
| SPCa | −1.11% |
| SPPa | −0.13% |
| DXCa | 1.44% |
| DXPa | −0.59% |
| FXCa | 0.11% |
| FXPa | −0.41% |
| LIBOR | 125.50% |

Embodiments of the present invention comprise computer components and computer-implemented steps that will be apparent to those skilled in the art. For example, calculations and communications can be performed electronically, and agreements can be composed, transmitted and executed electronically. An exemplary system is depicted in FIG. 4. As shown, computers 100 communicate via network 110 with a central server 130. A plurality of sources of data 160, 170 relating to, for example, hedge fund data and/or index data, also communicate via network 110 with a central server 130, processor 150, and/or other component to calculate and transmit, for example, HOST data. The server 130 may be coupled to one or more storage devices 140, one or more processors 150, and software 160.

Other components and combinations of components may also be used to support processing data or other calculations described herein as will be evident to one of skill in the art.

Server 130 may facilitate communication of data from a storage device 140 to and from processor 150, and communications to computers 100. Processor 450 may optionally include local or networked storage (not shown) which may be used to store temporary information. Software 160 can be installed locally at a computer 100, processor 150 and/or centrally supported for facilitating calculations and applications.

For ease of exposition, not every step or element of the present invention is described herein as part of a computer system and/or software, but those skilled in the art will recognize that each step or element may have (and typically will have) a corresponding computer system or software component. Such computer system and/or software components are therefore enabled by describing their corresponding steps or elements (that is, their functionality), and are within the scope of the present invention.

Moreover, where a computer system is described or claimed as having a processor for performing a particular function, it will be understood by those skilled in the art that such usage should not be interpreted to exclude systems where a single processor, for example, performs some or all of the tasks delegated to the various processors. That is, any combination of, or all of, the processors specified in the claims could be the same processor. All such combinations are within the scope of the invention.

The present invention has been described by way of example only, and the invention is not limited by the specific embodiments described herein. As will be recognized by those skilled in the art, improvements and modifications may be made to the invention and the illustrative embodiments described herein without departing from the scope or spirit of the invention.

What is claimed is:

1. A system comprising:
   memory operable to store at least one program; and
   at least one processor communicatively coupled to the memory, in which the at least one program, when executed by the at least one processor, causes the at least one processor to:
   access and process:
      data describing a fund index and funds on which said index is based;
      data describing one or more securities;
      data describing returns of: (a) said fund index, (b) funds on which said index is based, and (c) said one or more securities;
   identify a subset of funds on which said fund index is based as superior-performing funds over a period of time preceding a first time; and
   construct, at said first time, and based on said identified subset of funds, a first portfolio of securities whose return exceeds a return of said fund index over a first period of time,
   wherein the identification of the subset of funds includes causing the processor to calculate a relative risk-reward ratio for each fund of the funds on which said index is based and to assign said each fund of the funds on which said index is based into a quartile based on said relative risk reward ratio; and
   wherein said calculating the relative risk-reward includes causing the processor to calculate an excess return for said each fund of the funds on which said index is based over peer funds.

2. The system of claim 1, wherein said calculating the relative risk-reward includes causing the processor to calculate an averaged excess return for each fund of the funds on which said index is based by determining an average of the excess return for said each fund of the funds on which said index is based over a second period of time.

3. The system of claim 2, wherein said calculating the relative risk-reward includes causing the processor to divide the averaged excess return for each fund of the funds on which said index is based by a standard deviation of said excess return for each fund of the funds on which said index is based.

4. The system of claim 1, wherein one or more of said securities are derivative securities.

5. The system of claim 4 wherein at least one of said one or more derivative securities is a put option.

6. The system of claim 5, wherein said put option is an at-the-money put option.

7. The system of claim 4, wherein at least one of said one or more derivative securities is a call option.

8. The system of claim 7, wherein said call option is an at-the-money call option.

9. The system of claim 4, wherein at least one of said one or more derivative securities is an index swap.

10. The system of claim 1, wherein said processor is further caused to, at a second time that is subsequent to said first time, construct a second portfolio of securities whose return exceeds a return of said fund index over a second period of time.

11. The system of claim 10, wherein said second time is approximately one month after said first time.

12. The system of claim 1, wherein said construction of said first portfolio comprises causing the processor to identify a set of one or more weights, one weight for each security in said first portfolio, such that said set of weights minimizes return tracking error between said superior-performing funds and said first portfolio of securities over said first period of time.

13. The system of claim 12, wherein said tracking error is calculated based on a sum of squared return residuals between said first portfolio and said fund index.

14. The system of claim 12, wherein said securities in said first portfolio comprise one or more call options and one or more put options.

15. The system of claim 14 wherein said call options comprise one or more at-the-money call options and one or more at-the-money put options.

16. A non-transitory computer-readable storage medium having computer executable instructions recorded thereon that when executed on a computer, configure the computer to perform a method comprising:
  accessing and processing:
  data describing a fund index and funds on which said index is based;
  data describing one or more securities;
  data describing returns of: (a) said fund index, (b) funds on which said index is based, and (c) said one or more securities;
  identifying a subset of funds on which said fund index is based as superior-performing funds over a period of time preceding a first time; and
  constructing, at said first time, and based on said identified subset of funds, a first portfolio of securities whose return exceeds a return of said fund index over a first period of time
  wherein the identification of the subset of funds includes calculating a relative risk-reward ratio for each fund of the funds on which said index is based and assigning said each fund of the funds on which said index is based into a quartile based on said relative risk reward ratio; and
  wherein said calculating a relative risk-reward ratio for each fund of the funds on which said index is based includes calculating an excess return for each fund of the funds on which said index is based over peer funds.

17. The non-transitory computer readable medium as in claim 16, wherein calculating a relative risk-reward ratio for each fund of the funds on which said index is based includes calculating an averaged excess return for each fund of the funds on which said index is based by determining an average of said excess return for said each fund of the funds on which said index is based over a second period of time.

18. The non-transitory computer readable medium as in claim 17, wherein calculating a relative risk-reward ratio for each fund of the funds on which said index is based includes dividing said averaged excess return for each fund of the funds on which said index is based by a standard deviation of said excess return for each fund of the funds on which said index is based.

19. The non-transitory computer readable medium as in claim 16, wherein one or more of said securities are derivative securities.

20. The non-transitory computer readable medium as in claim 19 wherein at least one of said one or more derivative securities is a put option.

21. The non-transitory computer readable medium as in claim 20, wherein said put option is an at-the-money put option.

22. The non-transitory computer readable medium as in claim 19, wherein at least one of said one or more derivative securities is a call option.

23. The non-transitory computer readable medium as in claim 22, wherein said call option is an at-the-money call option.

24. The non-transitory computer readable medium as in claim 19, wherein at least one of said one or more derivative securities is an index swap.

25. The non-transitory computer readable medium as in claim 16, further comprising, at a second time that is subsequent to said first time, constructing a second portfolio of securities whose return exceeds a return of said fund index over a second period of time.

26. The non-transitory computer readable medium as in claim 25, wherein said second time is approximately one month after said first time.

27. The non-transitory computer readable medium as in claim 16, wherein constructing said first portfolio comprises identifying a set of one or more weights, one weight for each security in said first portfolio, such that said set of weights minimizes return tracking error between said superior-performing funds and said first portfolio of securities over said first period of time.

28. The non-transitory computer readable medium as in claim 27, wherein said tracking error is calculated based on a sum of squared return residuals between said first portfolio and said fund index.

29. The non-transitory computer readable medium as in claim 27, wherein said securities in said first portfolio comprise one or more call options and one or more put options.

30. The non-transitory computer readable medium as in claim 29 wherein said call options comprise one or more at-the-money call options and one or more at-the-money put options.

* * * * *